United States Patent Office 3,211,975
Patented Oct. 12, 1965

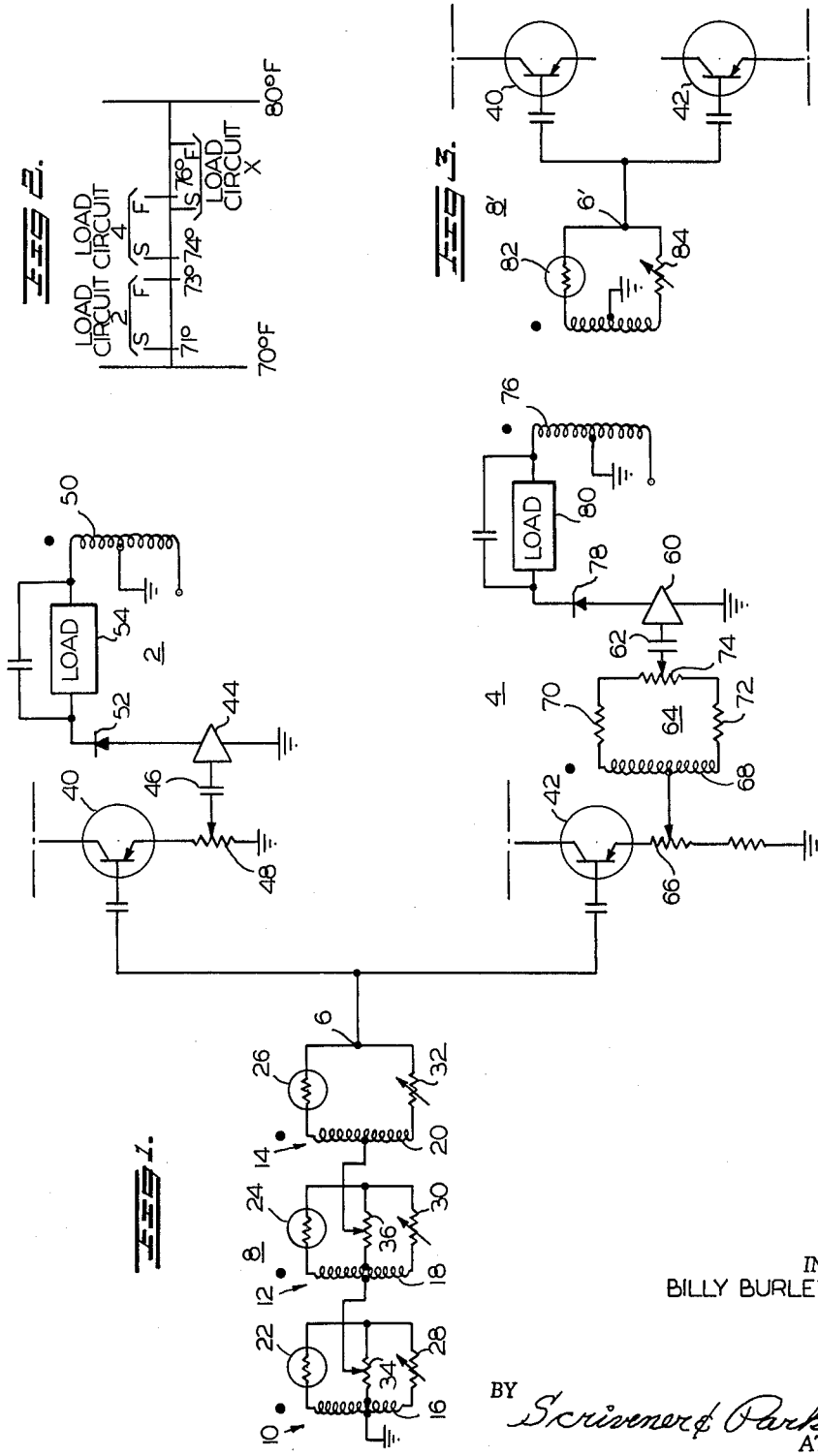

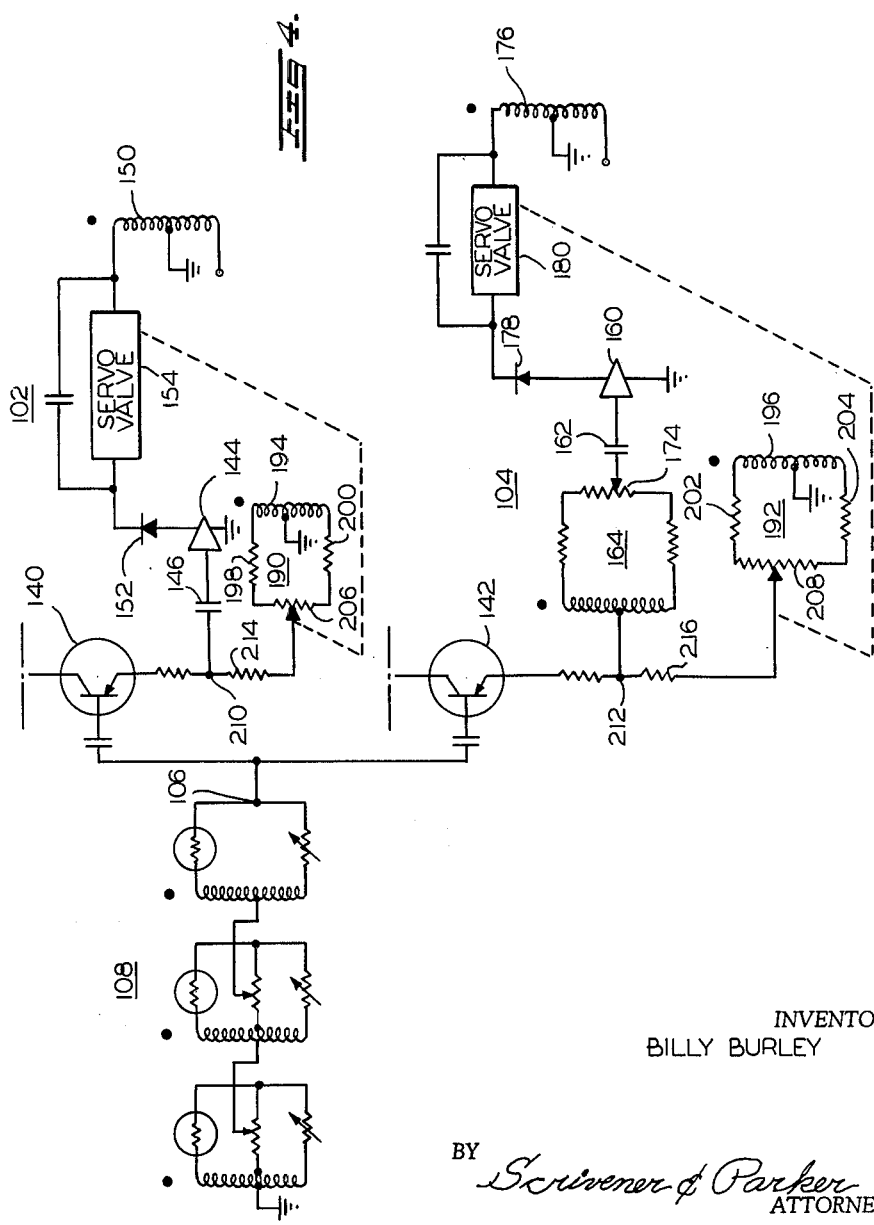

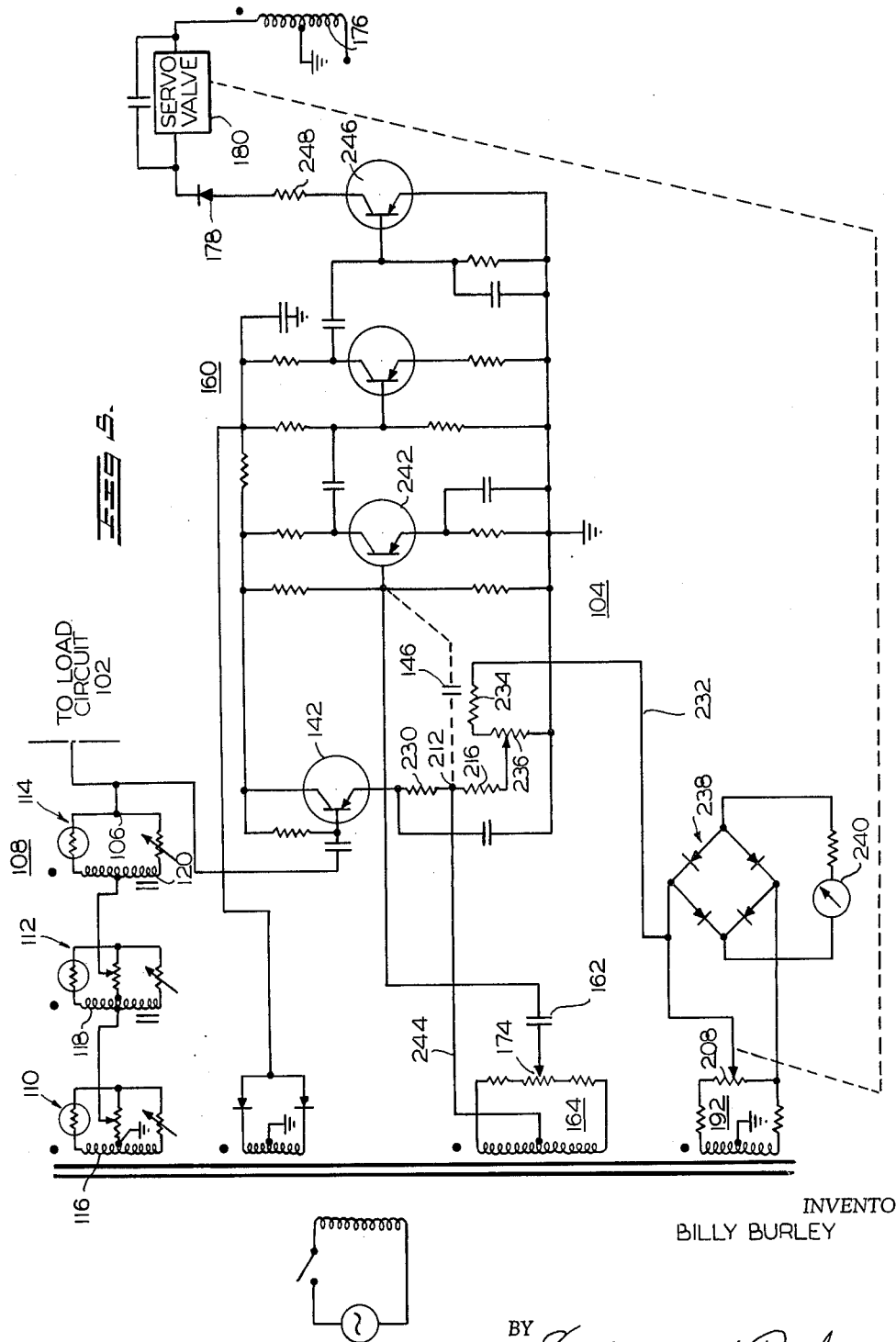

3,211,975
MODULATING CONTROL FOR A PLURALITY OF CURRENT RESPONSIVE LOADS
Billy Burley, Dallas, Tex., assignor, by mesne assignments, to Johnson Service Company, Milwaukee, Wis., a corporation of Wisconsin
Filed Sept. 12, 1962, Ser. No. 223,198
16 Claims. (Cl. 318—19)

This invention relates to an electronic control system having a plurality of selectively-operable current-responsive loads operated in modulating response to a single signal voltage produced by condition-responsive means.

In many electronic control systems it is desirable to operate a plurality of current-responsive loads in modulating response to the deviations of a condition from a predetermined value. While in certain cases the loads may be operated simultaneously, in other cases selective operation of the loads may be desired in accordance with the magnitude of the condition deviation. For example, in multi-zone heating and air conditioning systems, modulating control over regulators in the branch lines of the temperature modifying system may be desired for small deviations in a sensed condition, whereas modulating control over regulators in the main supply lines may be desired for large condition deviations. Concurrent or alternative successive control over the main and branch regulators is achieved in accordance with the requirements of the system. While heating and air conditioning electronic control systems have been disclosed in the prior art which afford selective control over a plurality of loads, these systems are relatively complex, expensive and often unreliable. Furthermore, when selective operation of the loads is desired, it is difficult to take into account all of the factors (such as changes in ambient temperature, room temperature, heat exchanger operation, boiler temperature, etc.) affecting temperature regulation. The present invention was developed to avoid these and other drawbacks of the known condition-responsive multi-load electronic control systems.

One object of the present invention is to provide a simple, inexpensive, reliable electronic control system including condition-responsive means producing a single control signal voltage, and a plurality of selectively-operable current-responsive loads each of which is operated in modulating response to said signal voltage.

Another object of the invention is to provide condition-responsive means operable to produce a single resultant signal voltage that is a function of the deviations of a plurality of conditions from respective predetermined values. In accordance with one feature of the invention, an electronic control system is provided which utilizes this resultant signal voltage to afford modulating control over a plurality of selectively-operable current-responsive loads. The condition-responsive means is characterized by the provision of a plurality of series-connected condition-responsive alternating-current bridges each of which is responsive to a different sensed condition to produce a signal voltage which is algebraically added to the corresponding signal voltages of the other bridges to produce the resultant signal voltage.

Another object of the invention is to provide a control system including a plurality of current-responsive load circuits operable in modulating response to a single signal voltage, at least one of said load circuits including "zero shift" or auxiliary signal generating means causing selective operation of said load circuits for different magnitudes of the single signal voltage.

Another object of the invention is to provide an electronic control system including current-responsive load means, condition-responsive means affording modulating control over said load means, and feedback means associated with said load means for producing an auxiliary signal voltage which compensates for the physical forces acting upon said load means during operation of the system.

A further object of the invention is to provide an alternating-current electronic control system including a plurality of current-responsive load circuits, condition-responsive means affording modulating control over said load circuits, feedback means associated with said load circuits for compensating for the physical forces acting upon the devices controlled thereby, an auxiliary zero-shift signal generating means effecting selective operation of said load circuits by said condition-responsive means.

Other objects and advantages of the invention will become apparent from a study of the following specification when considered in conjunction with the accompanying drawing, in which:

FIG. 1 is a simplified schematic diagram of an electronic system having condition-responsive means affording modulating control over a plurality of current-responsive loads;

FIG. 2 illustrates one manner in which successive operation of the loads may be achieved with the system of FIG. 1;

FIG. 3 illustrates a condition-responsive single-bridge network which may be substituted for the multi-bridge condition-responsive means of the system of FIG. 1;

FIG. 4 illustrates a modification of the system of FIG. 1 wherein the respective load control circuits are each provided with feedback means; and FIG. 5 is a circuit diagram illustrating the details of one of the load control circuits of FIG. 4.

Referring to FIG. 1, the condition-responsive system includes a pair of load control circuits 2 and 4 each having inputs capacitively connected with output terminal 6 of condition-responsive means 8. Means 8 comprises a plurality of series-connected condition-responsive bridges 10, 12 and 14 which include, respectively, energizing windings 16, 18 and 20, condition-responsive elements (for example, thermistors) 22, 24 and 26, and variable resistors 28, 30 and 32. The energizing windings may comprise the secondary windings of transformer means, not shown. Potentiometer 34 is connected at one end to the grounded-center-tap of winding 16 and at the other end to bridge 10 intermediate elements 22 and 28. The adjustable tap of potentiometer 34 is connected with the center point of winding 18. Similarly, the ends of potentiometer 36 are connected to the center point of winding 18 and a point on bridge 12 intermediate elements 24 and 30. The adjustable tap of potentiometer 36 is connected with the center point of winding 20. Owing to the series connection of bridges 10, 12 and 14, the resultant A.-C. signal voltage appearing at output junction 6 is the algebraic sum of the signal voltages developed by the respective bridges.

Load circuits 2 and 4 include input stage transistors 40 and 42, respectively, having base electrodes capacitively coupled with output junction 6. Load circuit 2 includes an amplifier 44 the input of which is connected with transistor 40 via an emitter-follower circuit including capacitor 46 and potentiometer 48. One output terminal of amplifier 44 is connected with ground and the other is connected with one end of grounded-center-tapped reference voltage winding 50 via diode 52 and current-responsive load 54. Load 54 may be an electro-mechanical actuator (for example, servovalve means) controlling the position of a regulating valve or damper arranged in the conduit of a heating and air conditioning system. The output stage of amplifier 44 comprises a transistor the emitter to collector circuit of which is connected in series with load 54. Diode 52 isolates the positive half cycles of the reference voltage developed by winding 50 from the transistor. When a signal voltage (appearing at junction 6) of suitable phase relationship relative to the reference voltage is applied to the base electrode of the transistor of amplifier 44 via transistor 40, potentiometer 48 and capacitor 46, the amplifier transistor is conductive during the negative half cycles of the reference voltage and establishes a level of effective D.-C. current flowing through load 54 that is a function of the magnitude of the signal voltage.

Load circuit 4 includes an amplifier 60 having an input connected with transistor 42 via an emitter-follower circuit including capacitor 62, zero shift network 64, and potentiometer 66. Network 64 includes series-connected energizing winding 68, resistors 70 and 72, and potentiometer 74. In a manner similar to that described above with reference to amplifier 44, one output terminal of amplifier 60 is connected with ground and the other is connected with one end of grounded-center-tapped reference voltage winding 76 via diode 78 and current-responsive load 80. The signal voltage appearing at junction 6 is conducted to the input of amplifier 60 via transistor 42, potentiometer 66, zero shift network 64 and capacitor 62 whereby the level of the effective D.-C. current flowing through load 80 is a function of the magnitude of the signal voltage. Windings 50, 76 and 68 may be the secondary windings of transformer means, not shown.

*Operation of the FIG. 1 embodiment*

Assume that the system of FIG. 1 is a heating and air conditioning system of the type wherein a plurality of loads are controlled in modulating response to a single signal voltage. Assume further that this single signal voltage is the resultant of three signal voltages each of which is a function of a different sensed condition (for example, room temperature, outdoor temperature, and "hot deck" temperature of heat exchanging means). Consequently, sensing elements 22, 24 and 26 of bridges 10, 12 and 14, respectively, are arranged at desired remote locations for sensing the appropriate conditions. If desired, the respective bridges may be of the capacitance compensated type disclosed in copending patent application Serial No. 81,179 filed January 6, 1961, and entitled "Wheatstone Bridge." Assume also that current-responsive loads 54 and 80 are spring-biased electro-mechanical actuators controlling, respectively, the positions of regulating valves in various branches of the temperature-modifying system.

When potentiometer 74 is set to cause zero shift network 64 to be in the center of its range, both load circuits 2 and 4 are caused to "operate in unison." Thus upon activation of the system, given temperature conditions are sensed by thermistors 22, 24 and 26 and a resultant signal voltage appears at junction 6 that is the algebraic sum of the respective signal voltages of bridges 10, 12 and 14. This signal voltage is applied to the base electrodes of transistors 40 and 42 via the coupling capacitors. If this resultant signal voltage has the proper phase relationship relative to the reference voltages produced by windings 50 and 76, amplifiers 44 and 60 effect levels of effective D.-C. currents flowing through loads 54 and 80, respectively, that are a function of the magnitude of the resultant signal voltage.

Consider now the effect of adjusting the adjustable tap of potentiometer 74 in such a direction as to cause zero shift network 64 to develop an A.-C. voltage that is out-of-phase with the resultant signal voltage appearing at the emitter electrode of transistor 42. This constant zero shift voltage will reduce the control signal applied to the input of amplifier 60 and the level of the effective D.-C. current flowing through load 80. Since the control voltage applied to the input of amplifier 60 is the algebraic sum of the out-of-phase zero shift network voltage and the in-phase resultant signal voltage, it is apparent that if the zero shift voltage is of sufficient magnitude, the control voltage applied to amplifier 60 may be such as to prevent conduction of amplifier 60 at a time when the resultant signal voltage appearing at junction 6 affords modulating control over load 54. By means of zero shift network 64, successive modulating operation of load circuits 2 and 4 may be achieved as shown in FIG. 2.

Assume, for the sake of simplicity, that the single bridge condition-responsive network 8' of FIG. 3 is substituted for the multi-bridge means 8 of FIG. 1. Assume further that temperature-responsive element 82 is arranged to sense room temperature and that adjustable resistor 84 is set to produce a given signal voltage at junction 6' when sensed temperature equals 70° F. (For example, resistor 84 might be set to cause bridge 8' to be balanced when sensed temperature equals 70°.) Assume further that as room temperature increases from 70° to 80°, the magnitude of the signal voltage appearing at junction 6' increases proportionately. With suitable calibration of the system, as sensed temperature increases progressively above 70°, at a given temperature (for example, 71°) amplifier 44 causes an effective current flow through load 54 which initiates the stroke of the electro-mechanical actuator controlling the associated regulating valve. Further increase in temperature results in further movement of the actuator until at 73° the actuator stroke is completed. Owing to the setting of potentiometer 74, the zero shift network voltage has prevented amplifier 60 from becoming activated. Assuming now that when sensed temperature increases to 74°, the resultant signal voltage appearing at the emitter of transistor 42 has such a magnitude as to overcome the opposing out-of-phase zero shift voltage, amplifier 60 becomes activated to initiate the stroke of the electro-mechanical actuator associated with load 80. As sensed temperature increases further, for example to 76°, the actuator of load circuit 4 progressively completes its stroke.

Owing to the high input impedances afforded by the emitter-follower circuits of transistors 40 and 42, the loading on the low impedance condition-responsive bridge means by the various paralleled load circuits is relatively small. Thus while only two load circuits have been illustrated, it is possible to connect additional control circuits, provided with zero shift selective control means, with junction 6 without overloading the condition-responsive means. Furthermore, the emitter-follower connection of transistor 42 serves to isolate the out-of-phase zero shift voltage from the condition-responsive bridge means whereby disturbing influence on the other actuators is avoided. Overlapping operation of the various actuators may be achieved by appropriate setting of the zero shift potentiometers as illustrated by the temperature range "LOAD CIRCUIT X" in FIG. 2.

The electronic system of FIG. 1 is, of course, responsive to the phase of the resultant signal voltage appearing at junction 6. Thus load circuit 2 may be calibrated to de-energize load 54 when the phase of the resultant signal voltage is reversed (i.e., the phase of the amplified signal voltage applied to the input of amplifier 44 is such relative to the reference voltage of winding 50 as to prevent conduction of the amplifier). Similarly, with zero shift network 64 in its center position, load 80 may be de-energized when the resultant signal voltage is of opposite phase.

Various modifications, of course, are possible. Since the zero shift network produces a constant signal, the variable tap of potentiometer 74 might be adjusted in a direction causing an in-phase voltage to be developed relative to the resultant signal voltage appearing at the emitter of transistor 42. Since the zero shift voltage is constant, the actuator shaft of load 80 may be caused to move to a position that is a function of the magnitude of the zero shift voltage even though the resultant signal voltage appearing at junction 6 equals zero. In order to reduce the input control signal to amplifier 60 to zero, the resultant signal voltage must have a phase relationship causing an out-of-phase signal voltage to be developed on the emitter electrode of transistor 42. With appropriate adjustment of potentiometer 74, a zero shift voltage might be developed which permits activation of load circuit 4 when the phase and magnitude of the resultant signal voltage is such as to deactivate load circuit 2.

In operation, the magnitude of the resultant signal voltage will vary for a given period of time and modulating control over the loads will be achieved until an equilibrium conditon is reached between the heat transfer medium and the desired temperatures at the various demands.

In order to compensate for physical forces acting on the electro-mechanical actuators (for example, the pressure forces acting on the servovalves developed by the fluids flowing through the heat transfer conduits) and to improve the response of the system, one or more of the load circuits of FIG. 1 may be provided with feedback means as shown in FIG. 4. Load circuits 102 and 104, which correspond with load circuits 2 and 4, respectively, of FIG. 1, are provided with feedback networks 190 and 192 which are operable to inject A.-C. signals upon the inputs of amplifiers 144 and 160, respectively, as a function of the positions of the actuating shafts of loads 154 and 180. Networks 190 and 192 include grounded-center-tapped energizing windings 194 and 196 (which comprise the secondary windings of transformer means, not shown), resistors 198, 200, 202 and 204, and potentiometers 206 and 208, respectively. The adjustable taps of potentiometers 206 and 208 are connected with points 210 and 212 of the emitter-follower circuits of transistors 140 and 142 via resistors 214 and 216, respectively. The adjustable taps of potentiometers 206 and 208 are mechanically coupled with electro-mechanical loads 154 and 180, respectively, as illustrated diagrammatically by the dashed lines.

*Operation of the FIG. 4 embodiment*

Assume that potentiometers 206 and 208 are set to cause servovalves 154 and 180 to have given throttling positions when the resultant signal voltage appearing at junction 106 equals zero. Assume further that spring-biased servovalve 154 is initially displaced from the desired position in a direction causing an in-phase feedback signal voltage (relative to winding 150) to be applied to the input of amplifier 144 via resistor 214 and capacitor 146. A level of current flows through servovalve actuator 154 that is a function of the feedback voltage. This current causes the actuator to be moved toward the desired throttling position, said actuator movement being accompanied by a reduction in the magnitude of the feedback voltage owing to the mechanical connection between potentiometer 206 and servovalve 154. If the actuator should overrun the desired throttling position, the feedback voltage becomes out-of-phase relative to the reference voltage of winding 150, amplifier 144 becomes de-activated, load 154 becomes de-energized, and spring-biasing means associated with the actuator causes the shaft to retract to the given position.

Assume now that a resultant signal voltage is developed at junction 106 which has such a phase relationship relative to reference voltage winding 150 as to cause conduction of amplifier 144. The current flowing through load 154 is a function of the magnitude of the signal voltage and causes the servovalve to be displaced from its given position. As the actuator shaft is displaced, potentiometer 206 is shifted in a direction causing a feedback voltage to be developed that is out-of-phase with the resultant signal voltage appearing at the emitter electrode of transistor 140. At summing point 210, the amplified signal voltage and the out-of-phase feedback voltage are added algebraically, whereby the magnitude of the control signal applied to the input of amplifier 144 is reduced to slow down movement of the actuator. When the actuator shaft reaches a point at which the feedback voltage and the amplified resultant signal voltage are equal in magnitude and opposite in phase, the shaft will come to rest since the voltage at summing point 210 is reduced to zero.

If the actuator should be at its given throttling position and a resultant signal voltage of opposite phase is developed at junction 106, amplifier 144 will be de-activated, load 154 will be de-energized, and the actuator will be displaced by its spring biasing means. This movement of the actuator causes displacement of potentiometer 206 in a direction to develop an in-phase feedback voltage signal. This feedback signal is algebraically added to the resultant signal voltage at summing point 210. When the actuator shaft reaches a position in which the feedback and resultant signal voltages are equal in magnitude and of opposite phase, the shaft will stop since the voltage at the summing point has been reduced to a level sufficient to maintain the shaft at the desired position.

A similar feedback operation is achieved with load circuit 104, the only difference being that the input signal to amplifier 160 is the algebraic sum of the resultant signal voltage, the feedback voltage produced by network 192, and the zero shift voltage produced by network 164.

It should be mentioned that all of the windings of the various control systems are energized by transformer means having the same frequency (for example, 60 cycles per second). The structural details of one of the load circuits (104) of FIG. 4 are illustrated in FIG. 5. While the operation of the system should be obvious from the above description, several general comments are in order. Condition-responsive elements 110, 112 and 114 are remotely arranged relative to the other arms of the respective bridges for sensing the desired physical conditions. In load circuit 104, the resultant signal voltage appearing at junction 106 is fed to summing point 212 via transistor 142 and resistor 230. The feedback voltage appearing at the adjustable tap of potentiometer 208 is applied to summing point 212 via conductor 232, resistor 234, potentiometer 236 and resistor 216. Rectifier means 238 associated with potentiometer 208 of feedback network 192 supplies current to indicating meter 240 which presents a visible indication of the position of servovalve 180. If no zero shift means are provided (load circuit 102, for example) summing point 212 is directly connected with the input stage transistor 242 of amplifier 160 via capacitor 146 (as shown in phantom), whereby the amplifier input senses the algebraic sum of the resultant signal voltage and the feedback voltage. In the load circuit (104) of FIG. 5, the algebraic sum of the resultant signal voltage and the feedback voltage appearing at summing point 212 is fed to zero shift network 164 via conductor 244 for algebraic addition with the zero shift signal voltage. The algebraic sum appearing at the adjustable tap of potentiometer 174 is applied to the input stage transistor 242 of amplifier 160 via capacitor 162. The emitter to collector circuit of the output stage transistor 246 is connected in series with reference voltage winding 176 via resistor 248, diode 178 and load 180. If the voltage applied to the base electrode of transistor 246 has the proper phase relationship relative to the reference voltage produced by winding 176, transistor 246 is conductive and establishes a level of effective D.-C. current flowing through load 180 that is a function of the magnitude of the control signal voltage applied to the base electrode.

While the electronic control has been disclosed in combination with a heating and air conditioning system, it is apparent that the concepts of the invention may be applied to other control applications. Control over various types of current-responsive loads may be obtained in response to deviations in conditions other than temperature. The use of alternating-current means (for example, differential transformer means) other than condition-responsive bridge networks is also contemplated. While the condition-responsive elements have been illustrated as being of the variable resistance type, it is apparent that with appropriate circuit modification, condition-responsive elements of the variable capacitance, inductance or impedance type may also be used. Depending on various adjustments and calibrations possible with the invention, considerable modification in the disclosed operations of the systems may be obtained as desired. Other modifications and embodiments of the invention may be achieved without deviating from the invention set forth in the following claims.

What is claimed is:

1. An electronic control apparatus for simultaneous modulating energization of a plurality of loads, comprising
    condition-responsive means generating a single control signal proportional to deviation of a condition from a selected condition;
    a plurality of current-responsive load circuit means having an output proportional to energization thereof and connected with said condition-responsive means and simultaneously operable in modulating response to said control signal, certain of the circuit means including a load terminal means actuated in proportion to the magnitude of the output signal;
    and auxiliary signal generating means including presettable means connected with at least one of said load circuit means for modifying the modulating response of said one load circuit means to said control signal and thereby presetting the deviation resulting in the simultaneous modulation with other loads.

2. Apparatus as defined in claim 1 wherein said condition-responsive means and said auxiliary signal generating means comprise alternating-current means having the same operating frequency.

3. Apparatus as defined in claim 2 wherein said auxiliary signal generating means comprises zero shift means producing an auxiliary signal voltage of constant phase and magnitude for effecting selective operation of said one load circuit means relative to another load circuit means in response to the magnitude of said signal voltage.

4. Apparatus as defined in claim 1 wherein said one load circuit means includes a current-responsive electromechanical load, and further wherein a second auxiliary signal generating means is connected with the output of the condition responsive means and comprising feedback means generating a second auxiliary signal voltage that is a function of the instantaneous position of said electromechanical load.

5. Apparatus as defined in claim 2 wherein said condition-responsive means comprises means for generating a plurality of control signals of corresponding frequency the respective magnitudes and phases of which are functions of the deviations of a plurality of conditions from predetermined values, and means for algebraically adding the various control signals to produce a single control signal.

6. Condition-responsive signal generating means, comprising
    a plurality of condition-responsive alternating-current bridge networks each having energizing windings and input and output connections with adjustable voltage dividing means connected across the output connections of at least one of the networks, said bridge networks being responsive, respectively, to the sense and magnitude of the deviations of different conditions from predetermined values;
    alternating-current means energizing said bridges with voltages of the same frequency;
    and means connecting said bridge networks in series to produce a single alternating-current resultant signal voltage that is the algebraic sum of the respective voltages appearing across the respective input and output connections of said bridge networks including a proportion of the voltage of the voltage dividing means.

7. An electronic control system, comprising
    a source of alternating-current voltage;
    a current-responsive load;
    a diode;
    current-regulating means connected in series with said source, said load and said diode;
    condition-responsive means applying a single alternating current signal voltage upon said current-regulating means to control the operatoin thereof, said single signal voltage having a phase and magnitude that is a function of the sense and extent of deviation of at least one condition from a predetermined value;
    and auxiliary signal generating means including an alternating current input means and an output means superimposing an auxiliary signal voltage upon, and of the same frequency as, said single signal voltage whereby a net operating signal voltage is operably impressed upon said current regulating means.

8. Apparatus as defined in claim 7 wherein said auxiliary signal generating means produces an auxiliary signal voltage having a given phase relationship relative to said voltage source and a given magnitude.

9. Apparatus as defined in claim 8 wherein said auxiliary signal generating means is adjustable to vary the magnitude of said auxiliary signal voltage and the phase relationship between said auxiliary signal voltage and said voltage source.

10. Apparatus as defined in claim 7 wherein said current-responsive load comprises an electro-mechanical actuator, and further wherein said auxiliary signal generating means is connected with said load to cause said auxiliary signal voltage to have a phase and magnitude that is a function of the sense and extent of displacement of said actuator from a predetermined position.

11. Apparatus as defined in claim 10 and further including zero shift signal generating means superimposing an additional signal voltage of constant phase and magnitude upon, and of the same frequency as, said condition-responsive single signal voltage.

12. A condition-responsive electronic control system, comprising
    condition-responsive means producing a single alternating current signal voltage that has a magnitude and phase that is a function of the sense and extent of deviation of at least one condition from a predetermined value;
    a plurality of load control circuits each of which includes a source of alternating-current voltage, a current-responsive load, a diode, an amplifier having a phase-responsive current regulating output stage connected in series with said source, said load and said diode, said amplifier including also an input stage, each of said load circuit means including further an emitter-follower transistor stage having an input connected with said condition-responsive means and an output connected with said amplifier input stage;
    and means applying upon the output of the emitter-follower stage of one of said load control circuits an auxiliary alternating-current voltage of the same frequency as said condition-responsive single signal voltage.

13. Apparatus as defined in claim 12 wherein said auxiliary voltage has a constant magnitude and a given phase relative to said voltage source to effect modulating operation of said one load control circuit for a different range of said condition-responsive single signal voltage than the range of operation of another of said load control circuits.

14. Apparatus as defined in claim 13 wherein said auxiliary signal voltage applying means is adjustable to vary the magnitude of the auxiliary signal voltage and also its phase relationship relative to said voltage source.

15. Apparatus as defined in claim 13 wherein the load of said one load control circuit comprises an electromechanical actuator, and further wherein said one load control circuit includes feedback means for applying upon the output of the emitter-follower stage of said one load control circuit a feedback signal voltage having a phase and magnitude that are functions of the sense and extent of displacement of the actuator from a predetermined position.

16. Apparatus as defined in claim 15 and further including means connected with said feedback means affording a visible indication of the instantaneous position of said actuator.

References Cited by the Examiner

UNITED STATES PATENTS

| | | | |
|---|---|---|---|
| 2,366,500 | 1/45 | Eastin | 236—78 |
| 2,604,267 | 7/52 | Smith | 318—471 |
| 2,724,236 | 11/55 | Chudyk | 318—19 X |
| 2,907,932 | 10/59 | Patchell | 317—148.5 |
| 2,929,583 | 3/60 | Kutzler | 318—489 |
| 2,967,982 | 1/61 | Dubbelman | 236—78 |
| 3,096,937 | 7/63 | Steiner | 318—19 X |

JOHN F. COUCH, *Primary Examiner.*